United States Patent
Pannek et al.

(10) Patent No.: US 6,863,438 B2
(45) Date of Patent: Mar. 8, 2005

(54) MICROSTRUCTURED THERMOSENSOR

(75) Inventors: Thorsten Pannek, Stuttgart (DE); Hans-Peter Trah, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/070,973

(22) PCT Filed: Jun. 7, 2001

(86) PCT No.: PCT/DE01/02145

§ 371 (c)(1),
(2), (4) Date: Jun. 25, 2002

(87) PCT Pub. No.: WO02/04905

PCT Pub. Date: Jan. 17, 2002

(65) Prior Publication Data

US 2002/0172255 A1 Nov. 21, 2002

(30) Foreign Application Priority Data

Jul. 11, 2000 (DE) .......................................... 100 33 589

(51) Int. Cl.[7] .............................. G01J 5/00; G01K 7/02; H01L 35/28
(52) U.S. Cl. ....................... 374/121; 374/179; 136/224; 250/338.3
(58) Field of Search .......................... 250/338.1, 338.3; 136/239, 224, 225, 227; 374/121, 133, 179, 181, 182

(56) References Cited

U.S. PATENT DOCUMENTS

| | | | | |
|---|---|---|---|---|
| 3,885,992 A | * | 5/1975 | Wilcox ....................... | 136/212 |
| 4,451,690 A | * | 5/1984 | Ishida ......................... | 136/201 |
| 4,456,390 A | * | 6/1984 | Junkert et al. ............... | 374/128 |
| 4,850,713 A | * | 7/1989 | Thery et al. ................. | 136/225 |
| 5,030,827 A | * | 7/1991 | Powell ....................... | 250/338.1 |
| 5,220,189 A | | 6/1993 | Higashi et al. | |
| 5,695,283 A | | 12/1997 | Johnson | |
| 5,982,014 A | * | 11/1999 | Paige .......................... | 257/467 |
| 6,203,194 B1 | * | 3/2001 | Beerwerth et al. .......... | 374/133 |
| 6,211,454 B1 | * | 4/2001 | Sano ........................... | 136/258 |
| 6,297,723 B1 | * | 10/2001 | Shoji et al. ................... | 338/28 |
| 6,300,554 B1 | * | 10/2001 | Du et al. ..................... | 136/213 |
| 6,348,650 B1 | * | 2/2002 | Endo et al. ................. | 136/201 |
| 2003/0052271 A1 | * | 3/2003 | Fedder et al. ............ | 250/338.4 |
| 2003/0141455 A1 | * | 7/2003 | Lambert et al. ............ | 136/224 |

FOREIGN PATENT DOCUMENTS

| | | |
|---|---|---|
| DE | 199 32 308 | 1/2001 |
| DE | 100 09 593 | 9/2001 |
| EP | 0 999 437 | 5/2000 |
| FR | 1 204 718 | 1/1960 |
| WO | WO 91/02229 | 2/1991 |

OTHER PUBLICATIONS

Gerwen et al., "Thin–Film Boron–Doped Polycrystalline Silicon 70%– Germanium 30% Forthermopiles", Sensors and Actuators A, El Sevier Sequoia S.A., Lausanne, CH Bd. A53, Nr. 1/3, (May 1, 1996), 325–328*.

* cited by examiner

Primary Examiner—Diego Gutierrez
Assistant Examiner—Mirellys Jagan
(74) Attorney, Agent, or Firm—Kenyon & Kenyon

(57) ABSTRACT

A micropatterned thermosensor, e.g., an infrared sensor, includes a supporting body and at least one thermocouple arranged thereon. The thermocouple also has a first material and a second material, which together form, at least in a pointwise manner, at least one thermal contact. Furthermore, it is provided that the first and/or the second material are configured at least regionally in the form of a meander-shaped or undulating-type circuit trace and extend on the supporting body. In addition, a micropatterned thermosensor having such patterned circuit traces, in which the first material is platinum or aluminum, and the second material is doped or undoped polysilicon-germanium.

11 Claims, 2 Drawing Sheets

MICROSTRUCTURED THERMOSENSOR

FIELD OF THE INVENTION

The present invention relates to a micropatterned thermosensor, e.g., an infrared sensor.

BACKGROUND INFORMATION

Conventional infrared sensors, such as they are used in safety engineering, plant technology or in the household appliance industry, measure the temperature of a body from the infrared radiation it emits. Basically, the distinction is made among so-called pyroelectric, bolometric as well as thermoelectric sensors.

It is conventional to produce thermoelectric sensors using thin-film technology, for instance on polyimide foil. Furthermore, micropatterned thermosensors based on silicon technology are also generally conventional.

German Published Patent Application No. 199 32 308 describes manufacturing a thermosensor in the form of a thermal column that is positioned on an at least substantially self-supporting membrane, the thermal contacts of this thermal column being designed to alternate as "hot" and "cold" thermal contacts and being connected to a supporting body by appropriate contact columns, as well as being electrically controllable via these contact columns. German Published Patent Application No. 199 32 308 also describes implementing the thermocouples running on the surface of the substantially self-supporting membrane in the form of circuit traces, which are alternately produced from a first and a second material, so that thermal contacts are created in the region where these two materials come in contact. The first material, in this case, is aluminum, while polysilicon is used as a second material.

German Published Patent Application No. 100 09 593 describes designing a micropatterned thermosensor in the form of an infrared-sensor, for instance, using sacrificial layer technology or some other etching technology, by first creating a thin, self-supporting membrane on a silicon substrate, which is thermally decoupled from a subjacent substrate due to its low thermal conductivity, so that in response to incident infrared radiation, the membrane is warmed more than the substrate. A plurality of micropatterned sensor elements or thermocouples are then situated on the membrane, which thermoelectrically convert a temperature difference between the center of the membrane and the substrate into an electrical signal that is proportional thereto. In accordance with German Published Patent Application No. 100 09 593, the material combinations platinum/polysilicon, aluminum/polysilicon or p-type doped polysilicon/n-type doped silicon are used for the thermocouples created on the self-supporting membrane in the form of circuit traces. The material combination polysilicon/aluminum, which is used primarily in bulk microtechnology, may have the advantage of being CMOS-compatible.

It is conventional that gold, antimony, bismuth and lead tellurides may also be used as materials for thermocouples, with gold also being suitable for bulk micromechanics.

It is an object of the present invention to provide a micropatterned thermosensor having improved sensitivity and stability at higher temperatures than conventional micropatterned thermal sensors.

SUMMARY

Due to at least one of the patterning of the printed circuit traces on the supporting body and/or the particular choice of materials for the thermocouple, the micropatterned thermosensor according to the present invention may have the advantage of achieving a higher temperature sensitivity, without this entailing significant changes in the current manufacturing methods for micropatterned thermosensors. Specifically, according to the present invention, it is merely the layout of the produced printed circuit traces of the thermocouples and/or the material used for depositing these printed circuit traces that are/is modified.

Through the choice of materials for the thermocouple, i.e., the material combination platinum or aluminum with doped or undoped polysilicon-germanium, the produced micropatterned thermosensor may have a markedly increased temperature stability compared to conventional thermosensors using aluminum with polysilicon, for instance, as material for the thermocouple.

Through the choice of materials for the thermocouple, migration effects occurring at temperatures above 200° C. may also be avoided, and thus stability problems in the produced thermosensor, as often observed in sensors where polysilicon and aluminum are used as material for the thermocouple.

Furthermore, the aluminum widely used in conventional methods is an excellent thermal heat conductor, which means that the thermocouple manufactured therefrom has a relatively low thermoelectric effectiveness, whereas platinum, on the one hand, may be used at temperatures of up to 400° C. and, on the other hand, has a thermal conductivity that is lower by a factor of 3 compared to aluminum. In contrast to polycrystalline silicon, polycrystalline, doped or undoped polysilicon-germanium also has a thermal conductivity that is lower by a factor of 3 to 8 and, therefore, also results in a markedly increased thermoelectric effectiveness of the produced thermocouple.

An especially high increase in sensitivity and an especially good temperature stability of the thermosensor may be achieved by a combination of the meander-shaped or undulating-type layout of the micropatterned circuit traces on the surface of the supporting body and the mentioned special materials for the thermocouple.

Depending on the intended use of the micropatterned thermocouple, for instance, as an infrared sensor, the mentioned materials for the thermocouple may be combined with one another, using p-type doped or n-type doped material for the semiconductor material.

Since a temperature difference between so-called "hot" and "cold" contacts may be thermoelectrically converted into a measurable electric voltage in micropatterned thermosensors, the "cold" points either may be kept at a constant temperature, or this temperature may be known or referenced relative to the temperature of the "hot" contact. Normally, for that purpose in conventional methods, so-called thermistors are integrated in hybrid technology on the supporting body for the thermocouple, since the employed materials, aluminum and polysilicon, are often not sensitive enough to determine this reference temperature.

When using platinum as thermoelectric material, it may be possible to integrate, or deposit, a high-precision, resistive temperature measuring element on the silicon chip, or the supporting body supporting the thermocouple, during the same manufacturing step as that for the corresponding printed circuit trace or conductor. This eliminates the need for an additional thermistor.

Implementing the printed circuit traces in the form of meander-shaped, or undulating-type printed circuit traces extending on the supporting body, may offer the further possibility of implementing only those printed circuit traces having the lower internal resistance in the form of meanders, since increased noise voltage may result when a meander or undulating-type pattern is used in materials having a high electrical resistance.

The meander-shaped or undulating-type circuit traces may be implemented as extending side-by-side and also as overlapping or running one over another, at least regionally, in which case they may then be separated from one another in an electrically insulating manner by suitable insulating layers of oxides, for instance. If sufficient surface area is available, it may be advantageous to configure the circuit traces side-by-side.

It may be possible to also vary, or increase, the sensitivity of the resulting micropatterned thermosensor by varying the number of undulations or meanders. In this context, one utilizes the fact that the thermal resistance of a printed circuit trace increases with length, that is, the thermal resistance of a printed circuit trace having a meander pattern is greater than that of one using a corresponding straight-line pattern.

The invention is explained in greater detail in the following description with reference to the drawing.

DETAILED DESCRIPTION

In the example embodiment, the present invention is initially based on an infrared sensor, as is described in German Published Patent Application No. 100 09 593. However, the infrared sensor it describes is modified in two respects.

Specifically, as described in German Published Patent Application No. 100 09 593, an at least substantially self-supporting membrane is created from a poorly heat-conducting material, such as an oxide, a nitride or a combination of both materials, on a substrate material having good heat-conducting properties, for instance, silicon. The at least substantially self-supporting membrane, which may be used as supporting body 12 for a thermocouple 20 to be deposited thereon, may be made of silicon dioxide, silicon nitride or of porous silicon.

Figure 1:
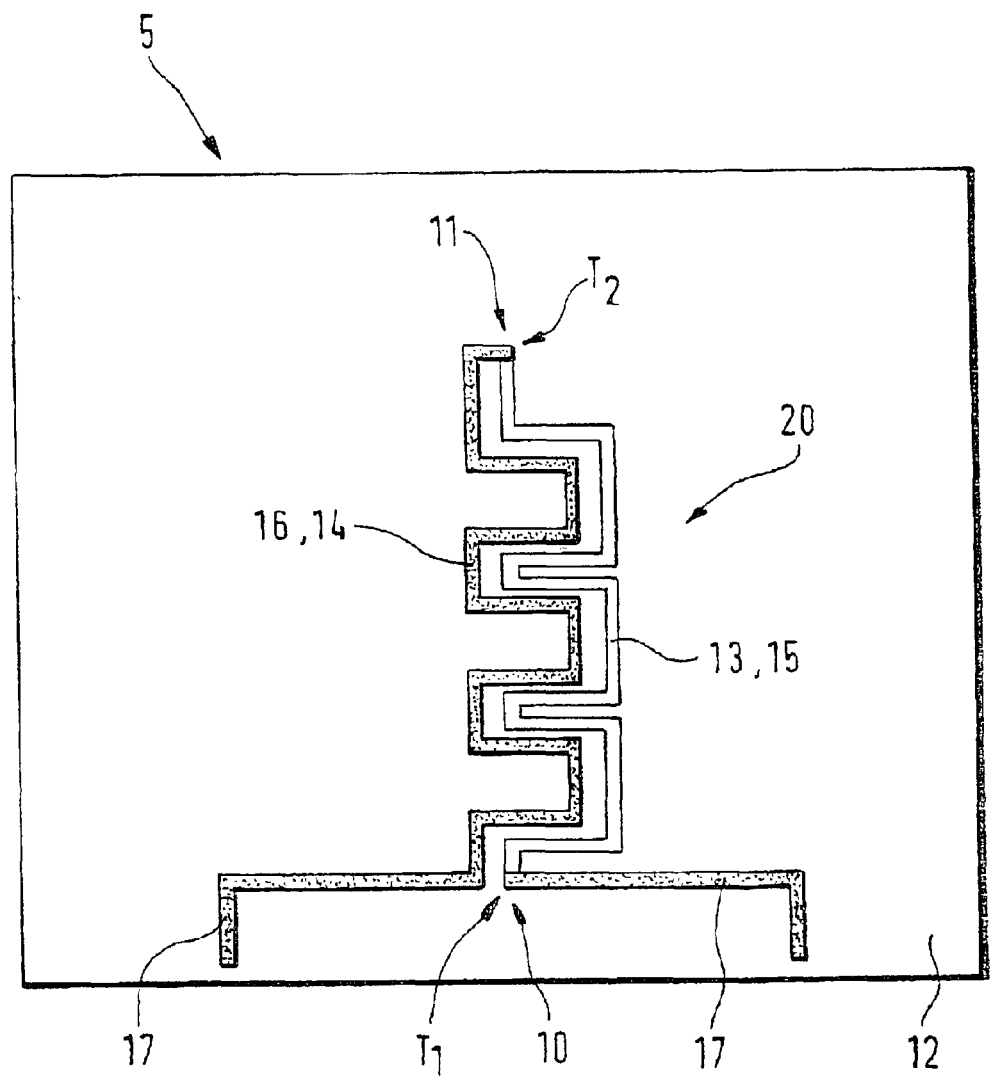
FIG. 1 illustrates a single thermocouple created on the surface of a supporting body in the form of deposited printed circuit traces running side-by-side.

A plurality of thermocouples 20 may be created on the surface of this supporting body 12. They may be connected in series and arranged in a cross-pattern or star-pattern. As illustrated in FIG. 1, which only illustrates one of these thermocouples 20, a first material 13 may first be deposited on supporting body 12 in the form of a first, meander-patterned circuit trace 15, and a second material 14 may be deposited in the form of a second circuit trace 16, which may be also meander-patterned. As illustrated in FIG. 1, first circuit trace 15 and second circuit trace 16 extend at least substantially parallel to one another.

First material 13 and second material 14 may come in contact with one another in the region of a first thermal contact 10 and a second thermal contact 11, and that further conductors 17 leading to thermocouple 20 may be provided, which may be developed and deposited in an analogous fashion to second printed circuit trace 16, so that thermocouple 20 may be electrically interconnected to, or controlled by, electronic components via these conductors 17, in a conventional manner.

Also illustrated in FIG. 1 is that first thermal contact 10 may be exposed to a first temperature $T_1$, and second thermal contact 11 may be exposed to a second temperature $T_2$. In this context, temperature $T_2$ is the actual temperature to be detected or measured by micropatterned thermosensor 5, while temperature $T_1$ is being kept at least approximately constant, or may alternatively be determined by an additional measuring device. In this respect, temperature $T_1$ of first thermal contact 10 ("cold" thermal contact) serves as a reference temperature for temperature $T_2$ of second thermal contact 11 ("hot" thermal contact), which may be measured.

The width of circuit traces 14, 15 and conductors 17 may be between 20 nm and 200 $\mu$m, e.g., between 1 $\mu$m and 20 $\mu$m. Their thickness may be between 10 nm and 10 $\mu$m, e.g., between 100 nm and 2 $\mu$m. The first or second printed circuit traces 15, 16, respectively, as well as their meander patterning, and conductors 17 may be fabricated in a conventional manner by sputter depositing or vapor depositing of the respective materials 13, 14, for instance through PECVD ("Physically Enhanced Chemical Vapor Deposition") or LPCVD ("Low Pressure Chemical Vapor Deposition").

First material 13 in the example embodiment may be n-type doped polysilicon-germanium, having a thermal conductivity of 3 to 8 w/km. Second material 14 in the example embodiment may be platinum, having a thermal conductivity of 70 w/km. Furthermore, analogously to second circuit trace 16, conductor 17 may be in each case developed in the form of a platinum circuit trace, resulting in two thermo-contacts 10, 11, both formed from the material combination of platinum/polysilicon-germanium.

Alternatively to the example embodiment illustrated in FIG. 1, first circuit trace 14 and second circuit trace 15 may also extend over one another, regionally or entirely, and be electrically insulated from one another, except for thermal contacts 10, 11. In this case, the electrical insulation may be assured by an oxidic, electrically insulating intermediate layer between circuit traces 15, 16.

Furthermore, instead of two thermal contacts 10, 11, a plurality of thermal contacts may also be provided, which may be configured in the manner of a thermal chain or a thermal column. In this case, at least two of the thermal contacts are exposed to different temperatures.

In a further example embodiment of the present invention, a part of a further measuring device may be additionally created, or integrated, on supporting body 12 in the form of a circuit trace, in order to determine first temperature $T_1$. This eliminates the need to integrate the usual thermistor on the surface of supporting body 12 in the area of first thermal contact 10.

The measuring device may be realized by providing an additional reference circuit trace made from platinum in one vicinity of first thermal contact 10 as sensitive component of this measuring device, this measuring device also being interconnected via appropriate conductors to generally conventional evaluation devices for determining a temperature-dependent electrical resistance of this reference circuit trace. This reference circuit trace may be designed, for instance, analogously to conductor 17 or second circuit board conductor 16.

Alternatively, however, the measuring device may also be realized by using one segment of second circuit trace 16 or of conductors 17 as reference circuit trace and may be interconnected to appropriate evaluating arrangements for determining the temperature-dependent, electrical resistance of this part of the circuit trace.

This possibility of integrating an additional reference circuit trace on supporting body 12, or the possibility of using a part of second circuit trace 16 or of conductor 17 as reference circuit trace on supporting body 12 to measure or monitor temperature $T_1$, is the result of platinum's suitability for high-precision, resistive temperature measuring.

With respect to further details regarding the design of thermocouple 20 and the function and the further design of thermocouple 5 according to FIG. 1, reference is made to German Published Patent Application No. 100 09 593, which describes this thermosensor 5, apart from the specific layout of circuit traces 15, 16 of thermocouple 20 and the choice of materials for thermocouple 20, in the form of an infrared sensor.

Figure 2:
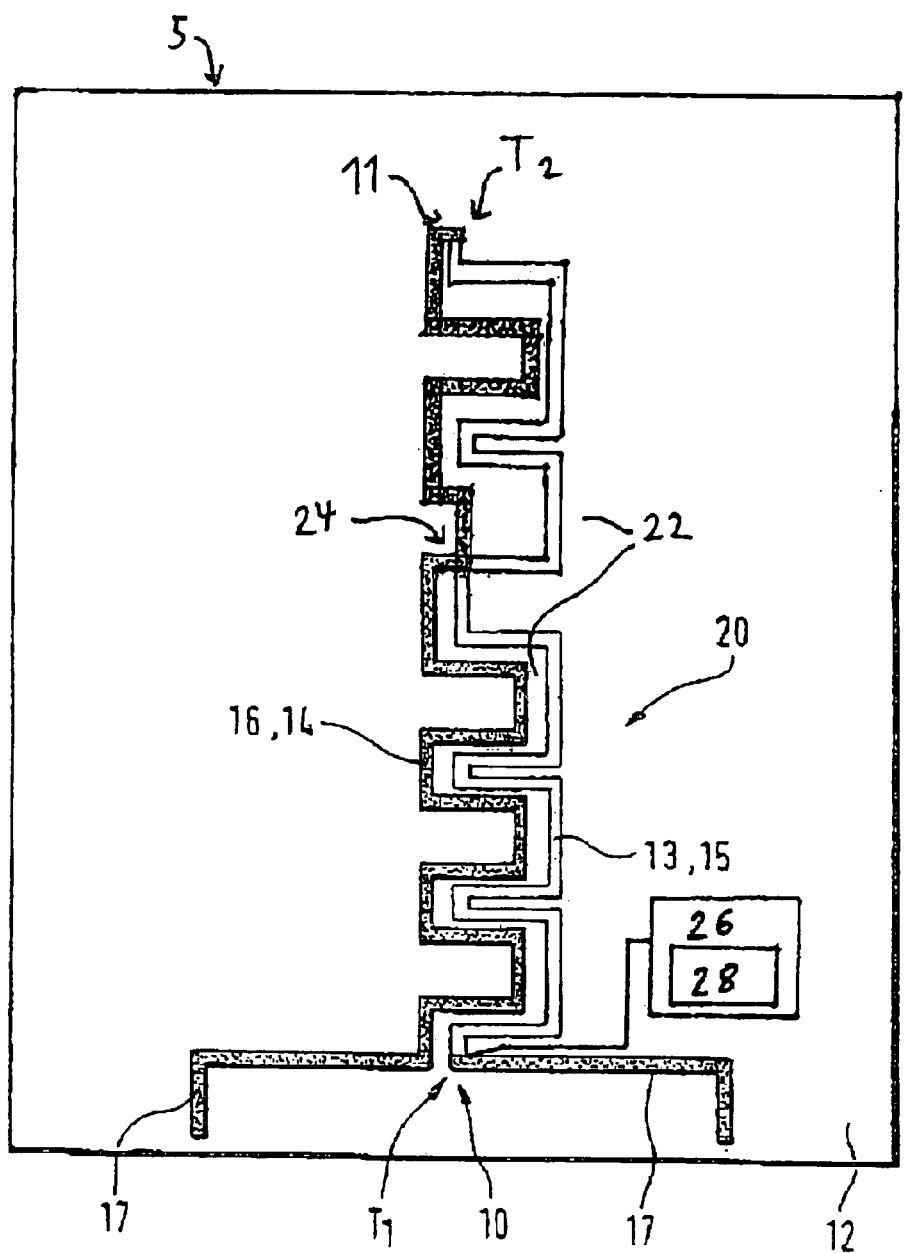
FIG. 2 illustrates a plurality of thermal contacts arranged in the form of a thermo-chain.

FIG. 2 shows a plurality of the thermal contacts (10, 11, 24), which are arranged in the form of a thermo-chain, at least (10) and (11) being subjected to different temperatures. The self-supporting membrane (22) acts as insulator between the two materials at the indicated locations, since it is made of an oxide, a nitride or a combination of both materials. An additional measuring device (6) having an evaluation means (28) is used for temperature measurement T1.

Figure 3:
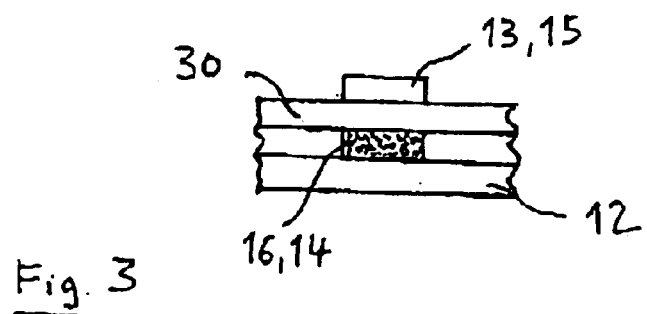
FIG. 3 shows a cut-away portion of a cross section of the membrane layer.

FIG. 3 shows a cut-away portion of a cross section of the membrane layer in which the two circuit traces (15, 16) run on top of one another. Except for the thermojunctions, they are electrically insulated from one another by an oxide layer (30).

What is claimed is:

1. A micropatterned thermosensor, comprising:
   a supporting body; and
   at least one thermocouple located on the supporting body, the thermocouple including a first material and a second material which form at least in a point-wise manner, at least one thermal contact with each other, at least one of the first material and the second material at least regionally configured in the form of one of a meander-shaped and an undulating circuit trace and arranged on the supporting body;
   wherein the first material and the second material extend one of substantially side-by-side in the form of circuit traces, the first material and the second material electrically insulated from one another with the exception of thermal contacts, and extend over one another at least regionally in the form of circuit traces, the first material and the second material electrically insulated from one another with the exception of thermal contacts;
   wherein the thermocouple includes a plurality of thermal contacts configured as one of a thermal chain and a thermal column, at least two of the thermal contacts to different temperatures; and
   wherein a first one of the thermal contacts is exposed to a first temperature, the first temperature kept one of constant and at least approximately constant, and a second one of the thermal contacts is exposed to a second temperature, the second temperature to be one of detected and measured, the thermosensor further comprising an additional measuring device configured to detect the first temperature.

2. The micro patterned thermosensor according to claim 1, wherein the micropatterned thermosensor is an infrared sensor.

3. The micropatterned thermosensor according to claim 1, wherein at least one of the first and the second material includes a material having low thermal conductivity.

4. The micropatterned thermosensor according to claim 1, wherein the measuring device includes one of includes a part of one of the circuit traces, arranged in the vicinity of one of the first thermal contact, and of a conductor, and a reference circuit trace as a sensitive component, arranged in a vicinity of the first thermal contact, and wherein the measuring device includes an evaluation arrangement configured to determine a temperature dependent, electrical resistance of one of the part of the trace, the conductor and the reference circuit trace.

5. The micropatterned thermosensor according to claim 4, wherein one of the part of the circuit trace, the conductor and the reference circuit trace includes a platinum circuit trace.

6. The micropatterned thermosensor according to claim 1, wherein the first and the second material includes at least one of platinum, gold, lead tellurides, aluminum, titanium, polysilicon, doped polysilicon, undoped polysilicon-germanium, and doped polysilicon-germanium.

7. The micropatterned thermosensor according to claim 6, wherein the first material includes one of doped and undoped polysilicon-germanium and the second material includes platinum.

8. A micropatterned thermosensor, comprising:
   a supporting body; and
   at least one thermocouple located on the supporting body, the thermocouple including a first material and a second material, which form at least in a point-wise manner at least one thermal contact with each other, the second material including platinum and the first material including one of doped and undoped polysilicon-germanium;
   wherein the first material and the second material extend one of substantially side-by-side in the form of circuit traces, the first material and the second material electrically insulated from one another with the exception of thermal contacts, and extend over one another at least regionally in the form of circuit traces, the first material and the second material electrically insulated from one another with the exception of thermal contacts;
   wherein the thermocouple includes a plurality of thermal contacts configured as one of a thermal chain and a thermal column, at least two of the thermal contacts exposed to different temperatures; and
   wherein a first one of the thermal contacts is exposed to a first temperature, the first temperature kept one of constant and at least approximately constant, and a second one of the thermal contacts is exposed to a second temperature, the second temperature to be one of detected and measured, the thermosensor further comprising an additional measuring device configured to detect the first temperature.

9. The micropatterned thermosensor according to claim 8, wherein the micropatterned thermosensor is an infrared sensor.

10. The micropatterned thermosensor according to claim 8, wherein at least one of the first material and the second material is configured at least regionally in a form of one of a meander-shaped and an undulating circuit trace and extends on the supporting body.

11. The micropatterned thermosensor according to claim 8, wherein the thermocouple includes a plurality of contacts configured as one of a thermal chain and a thermal column, at least two thermal contacts exposed to different temperatures.

* * * * *